(12) United States Patent
Rygg et al.

(10) Patent No.: US 12,054,229 B2
(45) Date of Patent: Aug. 6, 2024

(54) ROBOT WITH MAGNETIC WHEELS FOR CLEANING SHIP HULLS

(71) Applicant: JOTUN A/S, Sandefjord (NO)

(72) Inventors: Toril Fjeldaas Rygg, Kongsberg (NO); Roald Pedersen, Kongsberg (NO)

(73) Assignee: JOTUN A/S, Sandefjord (NO)

( * ) Notice: Subject to any disclaimer, the term of this patent is extended or adjusted under 35 U.S.C. 154(b) by 961 days.

(21) Appl. No.: 16/978,930

(22) PCT Filed: Mar. 8, 2019

(86) PCT No.: PCT/EP2019/055909
§ 371 (c)(1),
(2) Date: Sep. 8, 2020

(87) PCT Pub. No.: WO2019/170888
PCT Pub. Date: Sep. 12, 2019

(65) Prior Publication Data
US 2021/0047016 A1    Feb. 18, 2021

(30) Foreign Application Priority Data
Mar. 8, 2018  (GB) ..................................... 1803700

(51) Int. Cl.
*B63B 59/06*  (2006.01)
*B60G 3/02*   (2006.01)
(Continued)

(52) U.S. Cl.
CPC ............... *B63B 59/06* (2013.01); *B60G 3/02* (2013.01); *B60G 7/00* (2013.01); *B60K 7/0007* (2013.01);
(Continued)

(58) Field of Classification Search
CPC ......... B63B 59/06; B63B 59/10; B63B 59/08; B60G 3/02; B60G 7/00; B60G 7/001;
(Continued)

(56) References Cited

U.S. PATENT DOCUMENTS

| 633,910 A | * | 9/1899 | Schnepf ................. B63B 59/08 |
| | | | 15/52.1 |
| 3,088,429 A | * | 5/1963 | Johannessen .......... B63B 59/10 |
| | | | 15/52.1 |

(Continued)

FOREIGN PATENT DOCUMENTS

| CN | 1681701 A | 10/2005 |
| CN | 201291999 Y | 8/2009 |

(Continued)

OTHER PUBLICATIONS

Office Action for Egyptian Patent Application No. 2020091342, mailed Oct. 10, 2022, 15 pages.

(Continued)

*Primary Examiner* — Jacob D Knutson
*Assistant Examiner* — Abigail R Hymel
(74) *Attorney, Agent, or Firm* — Withrow + Terranova, PLLC; Vincent K. Gustafson

(57) ABSTRACT

The application describes a device in the form of a robot for performing operations on ship hulls. The robot comprises magnetic wheels enabling the robot to adhere to ferrous hulls via magnetic forces and a suspension arrangement for supporting the wheels on a body of the robot and for allowing the robot to travel over uneven surfaces. The wheels include a first pair of wheels and a second pair of wheels, with the pairs of wheels spaced apart from one another along a length of the robot. The suspension arrangement comprises a suspension pivot mechanism allowing a line extending between the centers of the first pair of wheels (Continued)

to rotate relative to a line extending between the centers of the second pair of wheels, along with a camber pivot mechanism for each wheel, with the camber pivot mechanism allowing the axis of rotation of the wheel to rotate relative to the axes of rotation of the other wheels in order that the wheel can align its axis of rotation with the surface of the hull. The magnetic forces for attaching the wheel to the hull act to rotate the suspension pivot mechanism and camber pivot mechanisms. The robot can therefore maintain a secure contact with the hull as it travels over the hull.

20 Claims, 8 Drawing Sheets

(51) Int. Cl.
  *B60G 7/00* (2006.01)
  *B60K 7/00* (2006.01)
  *B62D 3/02* (2006.01)
(52) U.S. Cl.
  CPC ........ *B62D 3/02* (2013.01); *B60K 2007/0092* (2013.01)
(58) Field of Classification Search
  CPC ......... B60K 7/0007; B60K 2007/0092; B62D 3/02; B08B 9/023; B08B 1/002; B08B 1/008; B25J 5/007; B25J 11/0085; B25J 19/0091; F16M 13/022
  See application file for complete search history.

(56) References Cited

U.S. PATENT DOCUMENTS

| | | | | |
|---|---|---|---|---|
| 3,609,612 | A * | 9/1971 | Tibbling | B63B 59/10 335/289 |
| 3,638,600 | A * | 2/1972 | Modrey | B63B 59/08 451/227 |
| 3,859,948 | A | 1/1975 | Romano et al. | |
| 4,270,484 | A * | 6/1981 | Shimatani | B05B 17/00 118/313 |
| 5,947,051 | A * | 9/1999 | Geiger | E21B 41/04 114/313 |
| 6,000,484 | A | 12/1999 | Zoretich et al. | |
| 2002/0129841 | A1 | 9/2002 | McGuire | |
| 2003/0127272 | A1 * | 7/2003 | Baker | B60N 2/90 180/326 |
| 2011/0282536 | A1 | 11/2011 | Rooney, III | |
| 2012/0006352 | A1 | 1/2012 | Darling et al. | |
| 2013/0340529 | A1 * | 12/2013 | Lama | G01N 29/226 901/1 |
| 2015/0148949 | A1 | 5/2015 | Chin et al. | |
| 2017/0081000 | A1 | 3/2017 | Cioanta et al. | |
| 2018/0331601 | A1 * | 11/2018 | Zhou | H02K 9/06 |
| 2019/0015971 | A1 * | 1/2019 | Carrasco Zanini | B62D 57/024 |

FOREIGN PATENT DOCUMENTS

| | | |
|---|---|---|
| CN | 202449187 U | 9/2012 |
| CN | 203410605 U | 1/2014 |
| CN | 203666942 U | 6/2014 |
| CN | 204488915 U | 7/2015 |
| CN | 105835976 A | 8/2016 |
| CN | 205574233 U | 9/2016 |
| CN | 106218836 A * | 12/2016 |
| CN | 106608346 A | 5/2017 |
| CN | 106697224 A | 5/2017 |
| CN | 206202618 U | 5/2017 |
| DE | 102012020121 A1 | 4/2014 |
| EP | 3225421 A1 | 10/2017 |
| GB | 2528871 A | 2/2016 |
| JP | 86226172 A | 2/1987 |
| JP | S6234865 A | 2/1987 |
| JP | 862139769 A | 6/1987 |
| JP | S62152983 A | 7/1987 |
| JP | 2016068702 A | 5/2016 |
| KR | 101378931 B1 | 3/2014 |
| KR | 20150053396 A | 5/2015 |
| KR | 20150053442 A | 5/2015 |
| KR | 20160057938 A | 5/2016 |
| WO | 2009110802 A1 | 9/2009 |
| WO | 2015122780 A1 | 8/2015 |
| WO | 2016076555 A1 | 5/2016 |

OTHER PUBLICATIONS

Substantive Examination Report for Saudi Arabian Patent Application No. 520420093, mailed 2/29/2022, 10 pages.
Intention to Grant for European Patent Application No. 19711047.1, mailed Jan. 16, 2023, 45 pages.
Notification of Reasons for Rejection for Japanese Patent Application No. 2020546917, mailed Jan. 24, 2023, 21 pages.
Notification of Transmittal of the International Search Report and Written Opinion (Form PCT/ISA/220), International Search Report (Form PCT/ISA/210), and Written Opinion of the International Searching Authority (Form PCT/ISA/237) for International Application No. PCT/EP2019/055909 mailed Jun. 17, 2019, 15 pages.
Search Report under Section 17(5) for United Kingdom Patent Application No. GB1803700.2 mailed Aug. 17, 2018, 4 pages.
First Office Action for Chinese Patent Application No. 2019800170747, mailed Jan. 14, 2022, 14 pages.
Xiangxiang, T., "Practical Anticorrosive Engineering Construction Manual," Chemical Industry Press, Apr. 2000, p. 1016.
Second Office Action for Chinese Patent Application No. 2019800170747, mailed Jun. 2, 2022, 19 pages.

* cited by examiner

ROBOT WITH MAGNETIC WHEELS FOR CLEANING SHIP HULLS

This application is a 35 U.S.C. § 371 national phase filing of International Application No. PCT/EP2019/055909 filed on Mar. 8, 2019, and claims the benefit of United Kingdom Patent Application No. 1803700.2 filed on Mar. 8, 2018, wherein the disclosures of the foregoing applications are hereby incorporated by reference herein in their respective entireties.

The present invention relates to a device in the form of a robot for performing operations on ship's hulls, such as a robot for cleaning of ship's hulls.

There is a need for cleaning and/or inspection of ship's hulls since the condition of the hull can vary over time. The speed of degradation of coatings on the hull and the speed of build-up of fouling may vary depending on the conditions experienced by the ship, which themselves depend on the activity of the ship in terms of the amount of time spent at sea and in port, and the locations in which the ship travels. It is desirable to allow for operations to be performed on the ship's hull, such as cleaning to remove fouling and/or inspection to determine the state of the hull.

Tracked robots—sometimes phrased "crawlers" are known for use on ship's hulls for these types of operations. Such robots have endless tracks containing magnets to adhere the robot to ferrous hulls. These robots can conduct operations during subsea traversing of hulls of vessels. US 2010/126403 shows one example of a crawler robot. Similar robots have also been proposed with magnetic wheels. For example, U.S. Pat. No. 6,000,484 discloses a robot with four magnetic wheels in a diagonal (rectangular) arrangement. In addition, alternative designs use suction systems or thrusters to press the robot against the surface of the hull. The latter designs have the disadvantage that they can only be used subsea and cannot be used above the waterline. A magnetic system can be used both above and below the waterline.

The concept of having three wheels has been proposed to ensure that all wheels will contact a curved surface without having to use resilient means for connecting the wheels to the chassis of the robot. The arrangement of the wheels however leads to a short distance from the centre of gravity of the robot to the "tipping over axis" which is between the contacts between two wheels and the surface in the relevant direction. Three wheeled robots are therefore less stable than four wheeled robots. In particular, with a three wheeled arrangement the distance between the adhering force, which holds the robot against tipping over, and the "tipping axis" is small when the robot is traversing the side of the hull, i.e. when the weight of the robot hangs down sideways compared to the magnetic forces between the wheels and the hull surface.

As noted above, U.S. Pat. No. 6,000,484 discloses a cleaning robot using four wheels in a diagonal arrangement. The wheels are fixed to axles, with one axle pivoted in the middle to allow it to tilt. This helps ensure that all four wheels will contact the hull surface with an equal force. The robot is steered by having a chassis which is split between the axes of the two pair of wheels, and connected to each other in an articulated joint, as in a steered horse-cart. This method of steering gives a relatively large steering radius, impairing the manoeuvrability of the robot. Further, if the magnetic wheels are wide, which can be necessary to ensure sufficient adhesive force, then this arrangement makes it impossible for the wheels to, at all times, have contact surfaces aligned to the surface of the hull over the width of the magnetic wheels, especially on a curved or uneven surface. The resulting non-magnet gap between the magnet and the ferrous surface decreases the adhesive force between the wheel and the hull. This again impairs the operation of the robot, such as by reducing traction or making the robot susceptible to tipping over or simply falling off the hull, or sliding when traversing the side of the hull. There is hence a need for a robot that can perform operations on ship's hulls with a wide range of hull surface characteristics, such as uneven surfaces.

Viewed from a first aspect, the invention provides a robot for performing operations on ship's hulls, the robot comprising: magnetic wheels enabling the robot to adhere to ferrous hulls via magnetic forces; and a suspension arrangement for supporting the wheels on a body of the robot and for allowing the robot to travel over uneven surfaces; wherein the robot comprises a first pair of wheels and a second pair of wheels, with the pairs of wheels spaced apart from one another along a length of the robot; wherein the suspension arrangement comprises a suspension pivot mechanism allowing a line extending between the centres of the first pair of wheels to rotate relative to a line extending between the centres of the second pair of wheels; wherein the suspension arrangement also comprises a camber pivot mechanism for each wheel, with the camber pivot mechanism allowing the axis of rotation of the wheel to rotate relative to the axes of rotation of the other wheels in order that the wheel can align its axis of rotation with the surface of the hull; and wherein the magnetic forces for attaching the wheel to the hull act to rotate the suspension pivot mechanism and camber pivot mechanisms.

Thus, with this arrangement the two pairs of wheels of the robot are allowed to shift relative to one another in accordance with the magnetic forces in order to adjust the relative height of the wheels, and the camber of each wheel is also adjusted individually in accordance with the magnetic force between the wheel and the hull of the ship. The wheels therefore shift in both position and camber in order to maintain a secure magnetic contact with the hull even if there is an uneven and/or curved hull surface. In addition, there is an equal distribution of forces between the wheels. The wheel surface may advantageously be rotated due to rotation of the wheel by the camber pivot mechanism to maximise the contact of the wheel with the hull. The camber compensating effect of this can ensure effective adhesion of the robot to the hull on uneven and/or curved hull surfaces.

It is noted that the proposed suspension arrangement is counter-intuitive in many respects compared to commonly known vehicle suspension arrangements since the main forces on the system are not due to the weight of the robot, but instead they arise from the magnetic forces that are used to secure the robot to the hull. Thus, the function of the suspension arrangement is not analogous to a vehicle suspension system that is used to bear loads from the weight of the vehicle. Such a vehicle suspension system has particular features as needed to transfer such forces efficiently whilst adjusting wheel position to ensure good grip between the wheels and the road. In contrast, the proposed suspension system for the robot with magnetic wheels is adapted for forces arising primarily from the attraction of the magnets to the hull. Such forces do not exist for conventional vehicle wheels. With the particular requirements of the proposed robot in mind the inventors have taken the unusual step of including a camber pivot mechanism for each wheel.

In some examples, there may be no bias in a camber pivot of the camber pivot mechanism, such as an absence of resilient component that apply a restoring force at the pivot during movement of the wheel around the pivot. Thus, in contrast to suspension arrangements for other purposes there may be no spring or other restoring mechanism affecting the camber of the wheel. Instead the camber pivot mechanism may allow free rotation of the axis of rotation of the wheel in reaction to the magnetic attraction of the wheel to the hull. It is understood that the absence of any such biasing means—together with using kinematical compensating means as described—facilitate an equal distribution of contact forces over the wheels of the robot, as well as over the contact path between each wheel and the hull. However, it is not essential to omit all resilience from the suspension arrangement and it is still possible to make an effective system in which there is some resilience, since the camber compensation via the camber pivot mechanism can equalise forces even when other resilient elements of the suspension arrangement are deformed under load.

Each wheel may have a camber pivot mechanism of similar design. The use of similar or identical parts contributes to a modular construction of the suspension arrangement, which is an advantageous feature of the example embodiments. The camber pivot mechanism may form a part of a wheel module that joins the wheel to the robot. This wheel module may comprise an axle for the wheel, with each wheel having an individual axle and the axle being able to rotate via the camber pivot mechanism.

The camber pivot mechanism may comprise a bracket and a stirrup member that supports the bracket. In that case the wheel may have an axle that is suspended from a bracket of the camber pivot mechanism, with the bracket extending from the wheel axle to a camber pivot of the camber pivot mechanism, wherein the camber pivot joins the bracket to the stirrup member. The camber pivot allows for rotation of the bracket and hence rotation the wheel axle relative to the stirrup member. The camber pivot may have an axis of rotation that is perpendicular to the axis of rotation of the wheel, such as an axis that is arranged to sit parallel to the surface of the hull when the robot is in use. The stirrup member may connect to the robot, such as via other parts of a wheel module that couples the wheel to the robot.

The axis of rotation of the camber pivot is advantageously placed relatively close to the surface of the hull, i.e. relatively close to the location where the wheel contacts the hull when in use. For example, the camber pivot axis may be located so as to be closer to the surface of the hull than the rotation axis of the wheel, i.e. so that with the robot in a "vertical" orientation as described below, the camber pivot axis is beneath the axis of rotation of the wheels. For example, the camber pivot axis may be closer to the surface of the hull than the rotation axis of the wheel by at least 10% of the diameter of the wheel, or by at least 15% of the diameter of the wheel. The placement of the camber pivot axis may be located so as to be closer to the surface of the hull than the rotation axis of the wheels enhances the behaviour of the suspension arrangement, especially in contact of a "passive" configuration in which there is no specific bias in the mechanism and no resilience, or limited resilience, in terms of forces acting to return the suspension to an "at rest" configuration.

The suspension pivot mechanism may include a pivot provided as a part of any type of mechanism for allowing one of the pairs of wheels to move relative to the other pair of wheels with a relative rotation of a notional line between centres of the pairs of wheels. For example, one of the pairs of wheels may be mounted to a pivoted beam that can rotate relative to the other pair of wheels. In this way the suspension arrangement may have some similar characteristics to a beam axle suspension as used in road vehicles, with the addition of adaptive camber due to the camber pivots at each wheel. Thus, one pair of wheels may be supported at either end of a beam and the suspension pivot mechanism may include a pivot for allowing the beam to rotate relative to a line extending between the centres of the other pair of wheels. The other pair of wheels might then be on a similar beam that forms the support for the pivot and may be termed a fixed beam. In some examples the pivoting beam may also pivot relative to a body of the robot, whereas the fixed beam may be rigidly attached to the body of the robot.

The use of such a pivoting beam system for the suspension pivot mechanism is seen as a simple and effective solution, although it should be appreciated that other suspension pivot mechanisms might be possible for allowing the required movement of the wheels. Such a pivoting beam with two wheels may be in a transverse or a longitudinal arrangement to the robot. In this document the more detailed discussion below deals with the transverse lay out, but it will be understood that either type of arrangement could be used in variations of the first aspect.

There may be no bias in a suspension pivot of the suspension pivot mechanism, such as an absence of resilient component that apply a restoring force during movement of the mechanism. Thus, there may be no spring or other restoring mechanism affecting the rotation of the pair of wheel about the suspension pivot. Instead the suspension pivot mechanism may allow for free rotation of one pair of wheels relative to the other in reaction to the magnetic attraction of the wheel to the hull. As with the absence of a bias in the camber pivot mechanism the absence of a bias for the suspension pivot mechanism allows for optimal movement of the suspension arrangement to ensure effective contact of the wheels with the hull.

In some examples this may be paired with an absence of bias in the camber pivot as discussed above. In some example embodiments the suspension the suspension arrangement has no resilient components acting during static loading of the suspension arrangement and hence no bias toward any particular positioning of the wheels whilst static, or at least no bias in relation to rotation of the camber pivots and suspension pivot. The result of this is that forces are more readily equalised between the wheels and that the robot is allowed to assume an optimal position for gripping the ship's hull via the magnetic wheels. In some cases the only resilience in the system arises from a resilient layer on the surface of the wheel as discussed below. However, in other cases there can be some added resilience to cushion the robot whilst not affecting the camber compensation and equalisation of loading via operation of the suspension pivot. In this discussion an absence of bias means that there is no deliberately introduced resilience via components including springs or resilient materials such as rubber. There may be some resilience tuned to absorb dynamic impact loads in order to prevent damage to the robot.

In one example the two pairs of wheels form a generally rectangular shape, with a wheel at each corner of the rectangle. The wheels may be at an outer part of the robot and advantageously may sit at extremes of the robot body, i.e. the wheels may be outboard of the main volume of the robot and spaced apart from the centre of gravity of the robot. This gives a stable arrangement. Whilst four wheels are required the robot need not have only four wheels and it is envisaged that in some modified forms the robot may have further wheels, such as a further pair of wheels supported via a further suspension pivot mechanism allowing a line extending between the centres of the further pair of wheels to rotate relative to the first and second pairs of wheels, i.e.

rotation relative to the respective lines through the wheel centres of each pair. The further wheels may each have a camber pivot mechanism as discussed above.

The robot may be steerable and the steering of the robot may be achieved via changes in angle of the wheels and/or control of the amount of rotation of each wheel. It is preferred for the robot to include steerable wheels where a steering mechanism allows for the wheels of at least one pair of wheels to rotate about an axis extending normal to the contact surface of the wheel. It will be appreciated that the degree of manoeuvrability varies depending on the steering mechanism that is used. Advantageously the robot may have a steering mechanism that allows for the wheels of both the first pair and the second pair of wheels to each rotate about an axis extending normal to the contact surface of the wheel. In cases where a camber pivot mechanism is used as described above then the steering mechanism may rotate the bracket of the camber pivot mechanism. Having the ability for four wheel steering along with such a camber pivot mechanism allows for maximum manoeuvrability, with a small turning circle, whilst ensuring that the wheels maintain optimal contact with the hull in order to keep the robot firmly adhered to the hull.

In some examples the steering mechanism includes a steering arm and a yoke for each steerable wheel, wherein the yoke is positioned in order to permit rotation of the wheels without a shift in position of the wheels. Thus, the wheel may advantageously be able to turn "on the spot" with no movement of the robot.

The robot may include hub motors for driving rotation of the wheels, preferably with hub motors for all wheels. The hub motor arrangement may optionally include gearing or the like located within the wheel. The use of hub motors avoids the requirement for transmission of rotation to the wheels from a drive system at some other location, and this makes it more straightforward to implement the required suspension arrangement, as well as to use a steering arrangement as discussed above. The hub motors may be coupled to the wheel such that they move with the wheel as the wheel changes camber, and thus the hub motors may be mounted to the brackets of the respective camber pivot mechanisms in the case of the bracket and stirrup system described above. Hub motors may advantageously be used to enhance the steering of the robot by allowing for opposing rotation of wheels at opposite sides of the robot and so on. With such a system the entire robot may be able to rotate without any other movement, and this allows for maximum manoeuvrability of the robot.

The robot may include wheels of the same design for the two wheels in each pair of wheels or for all of the wheels. This further enhances the modular nature of the robot's design and reduces the number of different parts that are used, which gives particular advantages in the case of the wheels where there is a relatively high degree of wear during use, leading to more regular replacement than for other parts of the robot.

As noted above the wheels may include a resilient layer on the surface of the wheel. The wheels may each have an outer layer of the same material. The use of a resilient layer can increase the frictional forces between the wheels and the hull. Where the magnetic wheels are the primary mechanism to hold the robot to the hull then the magnetic forces must withstand forces arising from gravity as discussed below, but they must also withstand forces from wave loading and fluid dynamic forces on the robot. When these forces occur parallel to the surface of the hull, or have significant components in parallel to the hull surface, then the resistance to movement of the robot due these forces is through the surface friction between the hull and the wheel, which acts to prevent sliding. Including a resilient layer allows for an increased coefficient of friction.

The resilient layer may be relatively thin in comparison to the diameter of the wheel, for example it may be less than 2% of the wheel diameter, optionally less than 1.7%. In direct terms this may imply a thickness of about 3 mm. Typically this applies to wheel diameters in the range between 150 and 220 mm. As noted above it is not necessary with the proposed design to allow any significant resilience for purposes of a suspension arrangement, although some resilience can be used to cushion the robot from impacts and so on. Therefore the thickness of the resilient layer can be relatively thin since it does not need to provide any significant cushioning effect. In fact it is an advantage to avoid significant elasticity in terms of the wheel position, and it is an advantage to avoid unduly increasing the spacing between the magnetic elements of the wheel and the surface of the ship's hull, since this would reduce the magnetic force holding the robot to the hull. However, it can be an advantage to allow for a thin deformable outer layer in order to maximise the contact patch and hence the friction between the wheel surface and the ship's hull even if there are small surface imperfections or fouling leading to roughened areas on the hull. It can also be an advantage to allow for a different material type for the contact patch of the wheel compared to the main structure of the wheel, which would be a relatively rigid material, such as the magnets of the wheel or a metal casing around the magnets, and this would not have the same coefficient of friction with the ship's hull as the resilient layer. The resilient layer may be an elastic material with rubber-like properties, such as rubber compounds or resilient polymer compounds, such as PUR.

Advantageously, the resilient layer may have a geometry selected for effective grip of the wheel on the ship's hull, such as a three dimensional surface pattern forming a tread of the wheel in a similar way to the tyre treads known for road tyres. The wheel needs to be able to clear water away from the surface of the hull and place the wheel surface in direct contact with the hull without any intervening water film, or at least with a minimal water film, even when the robot is traversing fully submerged parts of the hull. A three dimensional surface pattern allows for the water film to be minimised or avoided completely.

In view of the fact that the magnetic forces with the wheels can be the primary mechanism for attaching the robot to the hull, and when permanent magnets are used, then it can be useful to allow for some system to detach the robot from the hull. For example, if the robot suffers damage or fails for other reasons preventing it from returning from some remote part of the hull, then it may be useful to be able for it to detach itself from the hull to enable recovery from the water. One example is an ejector unit using a suitable mechanism to push against the hull and/or to tilt the wheels with sufficient force to detach the wheels from the hull. Such an ejector unit might be placed adjacent each wheel.

It will be noted that some of the features above allow for a modular arrangement for the robot, with similar parts being used in multiple differing locations on the robot. It is an advantage to minimise the number of different spare parts that are needed in situations where the robot will be installed on board a ship for use on long voyages. By allowing for a modular design a single spare part may be available for use at several points on the robot. Thus, elements of the suspension arrangement, the wheels and so on may use identical parts in multiple locations on the robot. Moreover, various parts or modules of the robot may be removable for replacement without the need for full disassembly of the robot. This allows for quick and efficient repair or replacement when there is a time constraint, with the module that is removed from the robot then being repaired and tested whilst it is off the robot, for example in a separate workshop on the ship or on shore. Thus, the wheels with the camber pivot mechanism may be removable as one module. The steering mechanism of the example embodiments may also be removable as a module and optionally the steering mechanism could be removable along with the wheel and camber pivot mechanism.

The hub motor of the example embodiments, together with its associated gearing, is removable from the robot along with the wheel, as well as being able to be detached from the wheel as required for inspection and/or maintenance. Each hub motor may be of the same design allowing for interchangeability of hub motors between all the wheels.

It may not be possible for all wheels and camber pivot mechanisms to use identical components since in order to operate effectively it may be best for some parts of wheels in a pair to be the inverse of each other. However, in example embodiments then diagonally opposite wheels and their camber pivot mechanisms may use one or more identical components, optionally they may be fully identical. Thus, a front left wheel and camber pivot mechanism may be the same as a rear right wheel and camber pivot mechanism, and similarly the front right may correspond in design to the rear left. This symmetry allows for reduced numbers of parts as spares as well as simplifying manufacture of the robot.

In the example embodiments the steering mechanism may also be identical for the diagonally opposite wheels, which further enhances the robot in terms of manufacture and maintenance.

The use of identical components for diagonally opposite wheels to form a modular arrangement is considered to be novel and inventive in its own right and therefore, in an alternative aspect to the first aspect, the invention provides a robot for performing operations on ship's hulls, the robot comprising: magnetic wheels enabling the robot to adhere to ferrous hulls via magnetic forces; wherein the robot comprises a first pair of wheels and a second pair of wheels, with the pairs of wheels spaced apart from one another along a length of the robot; wherein each wheel is provided within a wheel module that is removable from the robot, the wheel module comprising one or more suspension components and one or more steering components; and wherein diagonally opposite wheel modules are identical to one another.

Thus, for diagonally opposite wheel modules then the wheels as well as at least some of their suspension and steering components are identical. In some examples there is also identity between some components of the modules in the two diagonally opposite pairs, i.e. in some cases the same component may be used for each wheel. However it is typical for complete symmetry to be avoided so that parts of the wheel are optimised for movement at a certain 'corner' of the robot, hence with forward left having the same wheel module as rearward right, and forward right having the same wheel module as rearward left.

As will be appreciated from the above, for this aspect the wheel modules may include a camber pivot mechanism for the wheels and the identical components in opposite wheel modules may comprise at least some parts of the camber pivot mechanism, and optionally all parts of the camber pivot mechanisms. Thus, the robot may include camber pivot mechanisms that are fully identical in diagonally opposite wheel modules.

In the example embodiments the steering of the robot may be achieved via changes in angle of the wheels and/or control of the amount of rotation of each wheel as discussed above. Thus, the wheels may be steerable wheels where a steering mechanism allows for rotation of the wheel about an axis extending normal to the contact surface of the wheel, with diagonally opposite wheel modules including identical steering mechanisms. In cases where a camber pivot mechanism is used as described above then the steering mechanism may rotate the bracket of the camber pivot mechanism. In some examples the steering mechanisms includes a steering arm and a yoke for each steerable wheel, wherein the yoke is positioned in order to permit rotation of the wheels without a shift in position of the wheels, and wherein the yoke and the steering arm are identical for diagonally opposite wheel modules.

As noted above for the first aspect, the hub motors may be identical for corresponding wheel modules, and thus the hub motors and their associated gearing may be identical for diagonally opposite wheel modules.

It will further be appreciated that the robot of this alternative aspect may be combined with the features of the first aspect and/or with any of the other features discussed above as optional features relating to the first aspect. Thus, the robot of this aspect may include a suspension arrangement as discussed above for the first aspect, and/or it may include other features as set out herein. Hence, the robot may include a pivoted beam with a suspension pivot as discussed above, and this beam may extend in a transverse or a longitudinal direction of the robot.

It should be understood that the grouping of components into a module ideally requires mainly that the module can be removed and replaced as a single combined part. It does not exclude that the module may contain other smaller modules, such as a camber pivot mechanism module or a steering module, for example. It also does not exclude that the module may be a part of a larger module, such as the wheel modules being mounted to a beam module, for example.

In order that the robot can travel on vertical hull surfaces as well as partially or fully inverted on downwards facing hull surfaces at the base of the hull then the magnetic forces in example embodiments should exceed the weight force of the robot, for example by a at least a factor of 4 to 1, or a factor of 6 to 1. Thus, the magnetic wheels may be the primary mechanism to secure the robot to the hull and in example embodiments the magnetic wheels are the only mechanism used to secure the robot to the hull. The robot may hence have no other magnetic systems for gripping the hull and/or no other different mechanisms such as thrusters or vacuum suction.

The robot is for performing operations on ship's hulls whilst attached to the hulls by the magnetic wheels. The operations may include cleaning and/or inspection of the ship's hull. In example embodiments the primary purpose of the robot is for cleaning the surface of the ship's hull, for example to remove fouling and/or to maintain a paint finish of the hull. Inspection of the hull may be carried out at the same time.

In order to perform cleaning operations the robot may include a cleaning mechanism, which may be a brush. A preferred form for the brush is a cylindrical brush with the axis of the cylinder generally parallel to the hull surface and the brush being arranged to rotate about its axis to apply a cleaning action to the surface when it is in contact with the surface. This brush may include a number of flexible brush elements about its circumference, such as bristles or flexible vanes. A rotating cylindrical brush may be mounted forward of the wheels such that during forward the brush may act on the ship's hull before either pair of wheel contacts the hull. The length of the cylindrical brush may extend over the full width of the robot and optionally may extend beyond the outer extent of the wheels. This allows the brush to clear a path for the wheels during forward movement of the robot and increases the width of each cleaning pass without the brush becoming an obstruction that unduly decreases manoeuvrability of the robot.

The invention extends in a further aspect to the use of the robot described above for performing operations on a ship's hull, such as a method of cleaning a ship's hull comprising use of a robot as described above, which may include any of the optional or example features described above.

The invention also extends to the manufacture of a robot as described above, including optionally features thereof. Thus, a method of manufacture of a robot may include providing features as described above in relation to any aspect and coupling those features together in appropriate fashion in order to assemble the robot. Advantageously this may include a modular type construction using modular elements and/or identical parts as described above.

Certain preferred embodiments will now be described by way of example only and with reference to the accompanying drawings, in which FIG. 1 shows a hull cleaning robot in perspective view;

Figure 1:
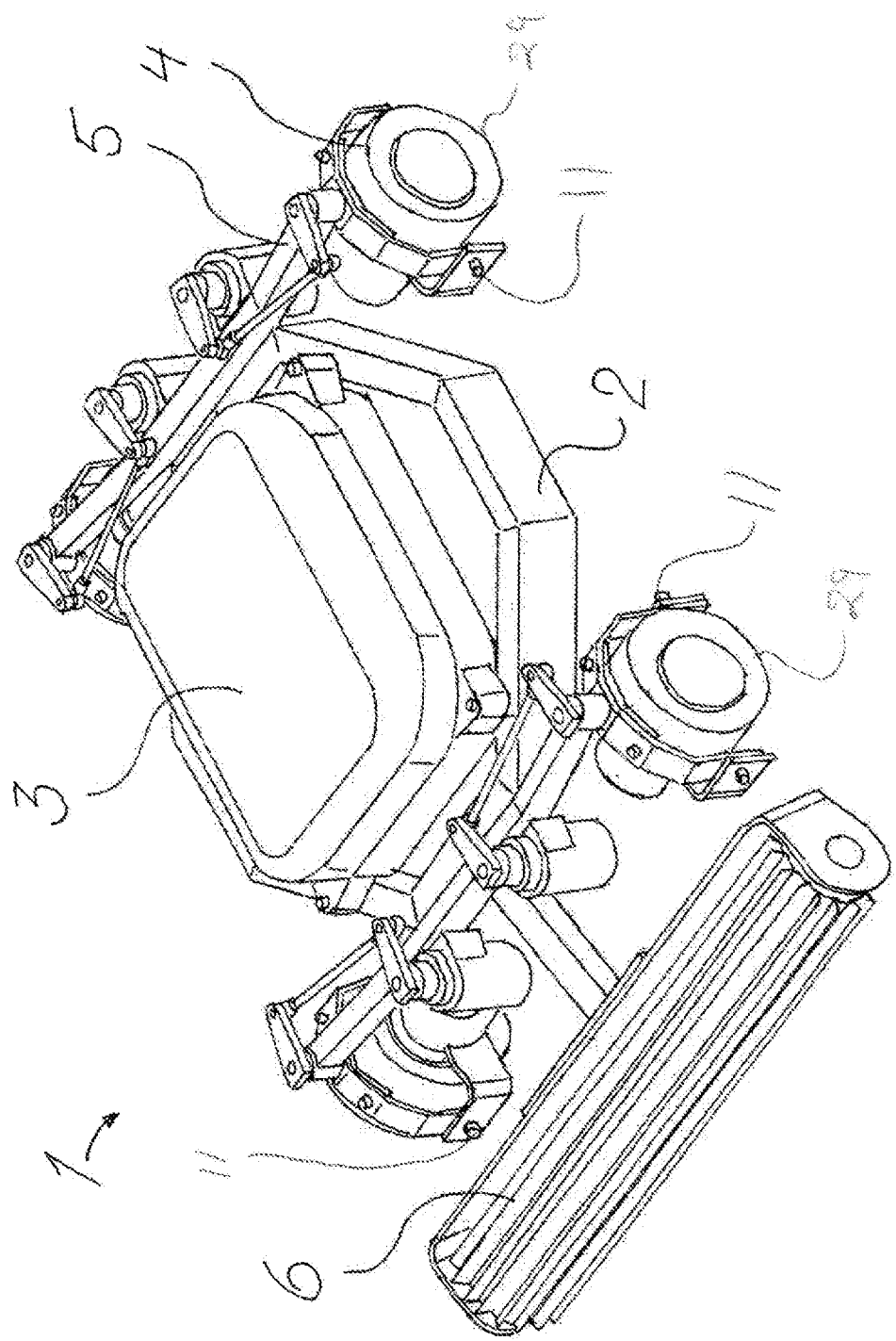
Figure 6B:
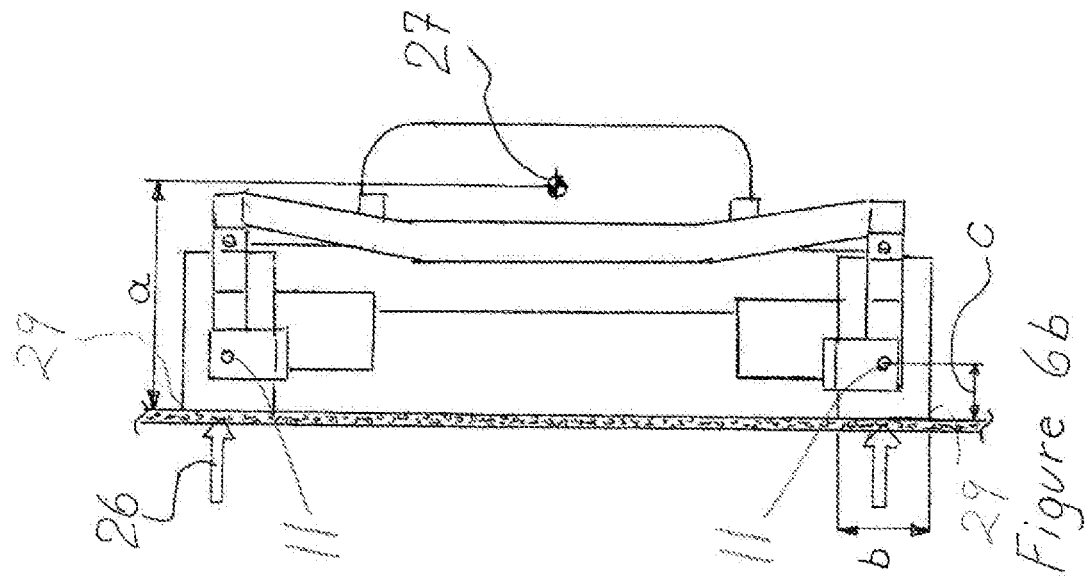
Figure 6A:
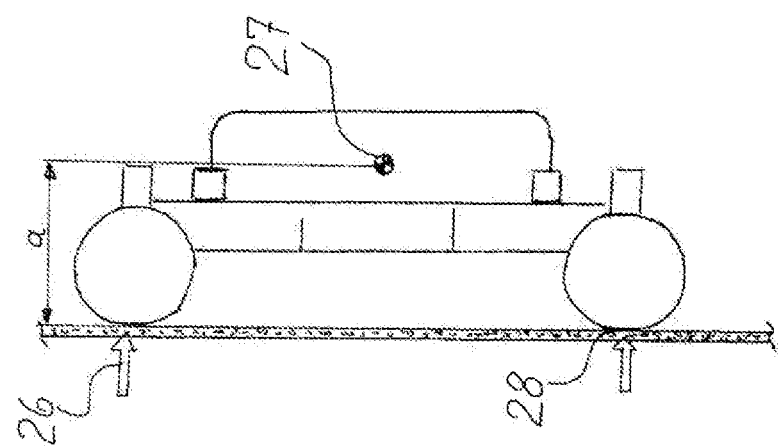
Figure 7:
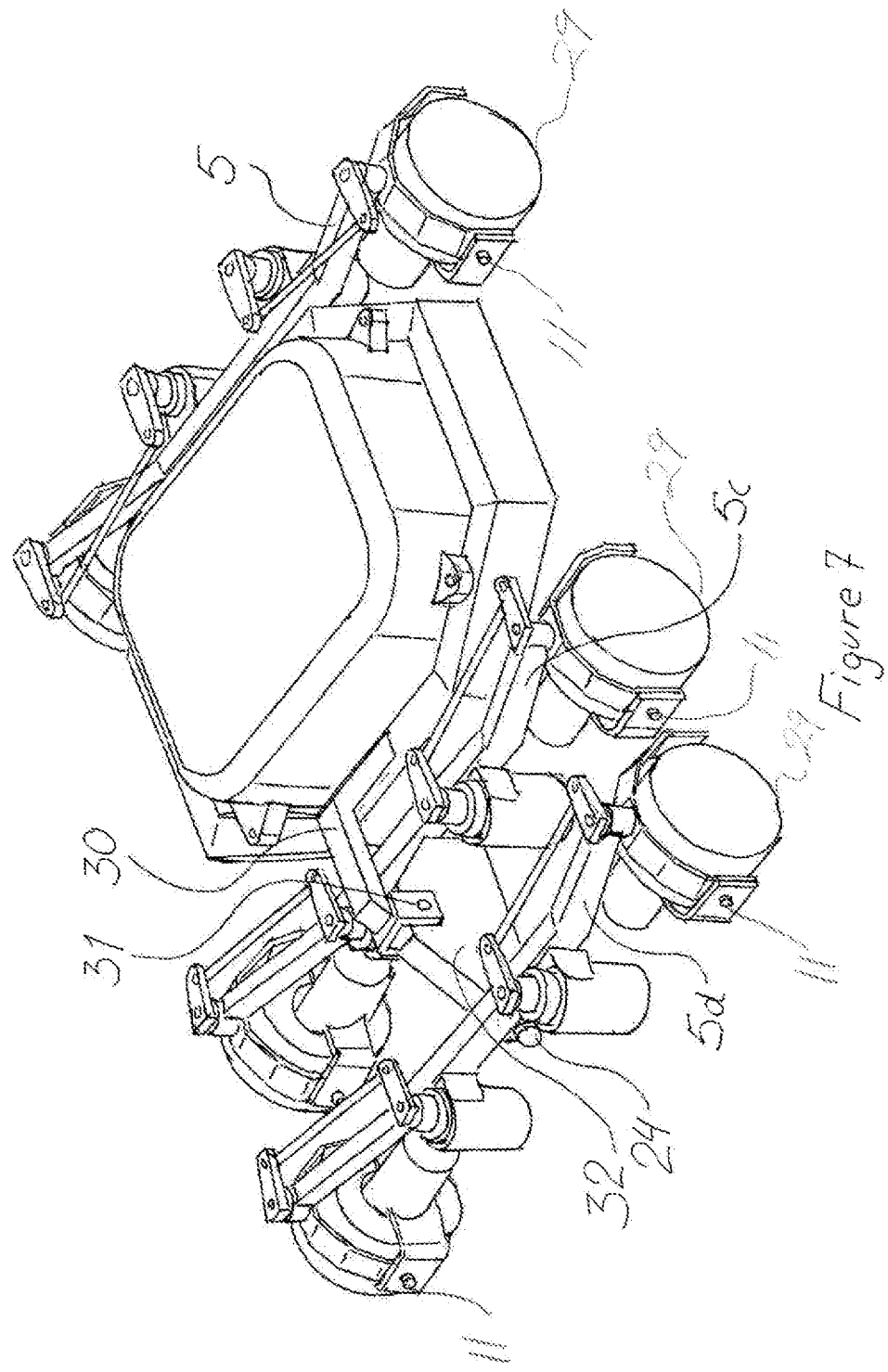
Figure 8:
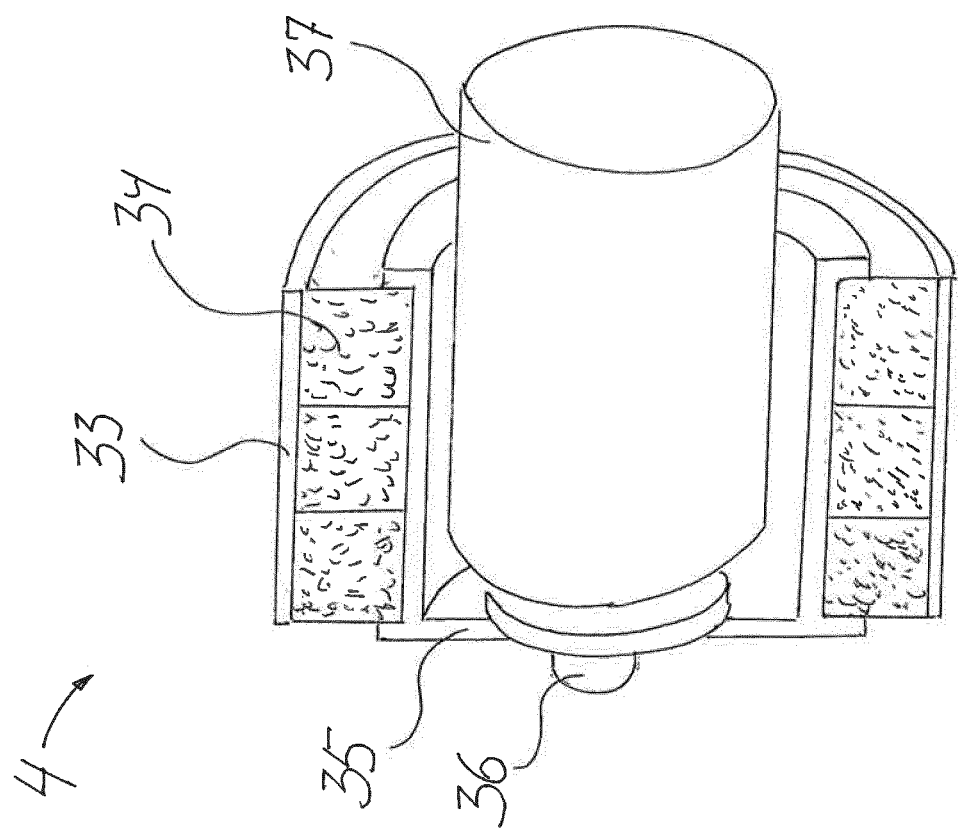

FIGS. 6*a* and 6*b* show the effect of orientation of the robot on the tipping forces that need to be resisted by the magnetic wheels and the suspension arrangement;

FIG. 7 shows an example of another hull cleaning robot with an additional pair of wheels compared to the robot of FIG. 1; and FIG. 8 shows a cut-away view of a magnetic wheel.

As shown in the Figures, a wheeled underwater robot 1 is proposed for purposes such as cleaning (grooming) the painted hulls of marine vessels. The wheels 4 of the robot are magnetic, in order to adhere to ferrous hulls. The robot 1 is driven by the wheels 4, and the wheels 4 are driven by electric motors 9 through reduction gears, both of which are fitted to the wheels 4 with some components inside the wheels 4. The expression "wheel hub drive" is commonly used for this type of propulsion system.

The wheels 4 are steered about axes perpendicular to the robot chassis 2, i.e. generally perpendicular to the hull surface since the robot chassis 2 will often sit perpendicular to the hull surface.

During a cleaning operation, the robot 1 traverses the hull surface 25 under the hull and at the sides, as well as the bilge in-between the sides and the bottom of the hull. It grips to the hull surface using only the magnetic wheels 4, i.e. there are no other mechanisms to adhere the robot 1 to the hull in this example embodiments.

The robot 1 will be stationary at a robot station (not shown in the Figures). The robot station will be positioned on the vessel above the sea level. It allows for parking of the robot 1 between the operations. In other words the robot 1 will traverse the side of the hull before and after the required operations and it will return to be garaged in the robot station once the operation has been completed.

Since the magnet wheels 4 are the mechanism use to adhere the robot 1 to the hull then they are configured to meet the following requirements:

Hold the robot 1 against the gravity forces in all positions, such as when being at the side of the hull, or under it.

Hold the robot against fluid forces such as from waves, currents, movement of the ship etc.

Provide sufficient adhesive force to the wheel 4 to generate enough friction between the wheel 4 and the hull to enable the necessary propulsion force (moment, torque) to be transmitted.

Stay in contact with the hull during adverse geometrical conditions, such as when traversing the bilge area at an angle, or when going over geometrical irregularities of the hull, such as dents and protrusions such as welds, pipe exits and so on.

The magnetic wheels 4 include permanent magnets arranged around the circumference of the wheel and held on a metal housing, for example as shown in FIG. 8 and as discussed below. The metal housing might include a casing around an outer circumference of the magnets and/or a support at an inner circumference of the magnets. A thin layer (cover, lining) of a resilient material such as a rubber or polymer material is formed around the outside of the wheel in order to distribute the contact with the hull. An optimized compound has good frictional characteristics in many conditions. However it is known that a painted hull, particularly one with initial marine growth onto it, may have a relatively low coefficient of friction to a wheel cover according to the above. It is also known that the adhesive force between a magnetic wheel 4 and a ferrous surface is governed by the distance between the magnetic bodies of the wheel and the surface. In other words the "parasitic" non-magnetic gap—as dictated by the thickness of the wheel cover (lining), should not be allowed to increase above the already dictated gap. Thus, the wheel cover is relatively thin in order to ensure a secure magnetic adhesion to the hull, and in the preferred embodiments the thickness of the resilient material of the wheel cover is 1.7% or less of the diameter of the wheel, or less than 3 mm.

The proposed robot 1 further includes a wheel suspension arrangement as described in more detail below, with the suspension arranged to ensure that forces are equalised between the wheels as well as being kept relatively constant across the width of the wheel. The embodiment of FIGS. 1 to 6 uses four wheels in a diagonal arrangement (i.e. two pairs of wheels 4). The two pairs of wheels 4 are mounted on beams 5 with one of these beams being tilt-able about a pivot 24. There is individual steering for all of the wheels 4 about a steering axis that is more or less perpendicular to the robot chassis 2, connected to a stirrup-type (can also be single-sided) member 12 which connects to the wheel 4 through a camber pivot 11 that enables the wheel 4 to camber (to lean) so that it has more or less equal contact (pressure) to the surface of the hull, over the width (tangent) of the wheel 4.

This arrangement can be expanded to have one or more further pairs of wheels, with the further pair(s) of wheels each mounted on pivoting beams similar to the pivoting beam of FIGS. 1 to 6. The additional wheels have a camber pivot mechanism similar to the wheels of the four wheeled robot. An example with three pairs of wheels is shown in FIG. 7. The additional pair of wheels may be steered or not steered and it may be with or without a motor drive. In the case of a further pair of wheels without a motor drive then it will be appreciated that the wheels provide added stability and increased magnetic attraction to the hull.

In the case of both the four and six wheel examples (and indeed if further pairs of wheels are added) the combination of pivoting beam suspension and a camber pivot mechanism for each wheel means that all wheels of the robot contact an uneven hull surface with an equal force, in a "camber compensating" arrangement for each wheel according to the above.

The features of the robot will now be described in more detail with reference to the Figures. It should be noted that references to "vertical" in the description of the robot are in relation to a vertical of the robot, i.e. perpendicular to the surface on which the robot stands, and independent of the direction of the gravity force.

In FIG. 1, the robot 1 is shown fully assembled in a perspective view. The chassis 2 of the robot 1 is a perimeter frame that holds a sealed container 3 that encloses an electronic control system for the robot as well as other electrical components, such as a power supply (e.g. batteries), communications systems, data recordal systems and so on. The container 3 is waterproof and sealed to prevent water ingress. Suitable arrangements of grommets or similar can be used to allow for cables and the like to pass through the casing of the sealed container 3. The chassis 2 and container 3 will together form a body for the robot 1, along with a protective covering (not shown). Two beam "axles" 5 are fixed to the chassis 2 and these beams 5 support the wheels 4 as well as associated elements of the suspension arrangement and steering mechanisms for the wheels 4. It will be appreciated that the beams 5 do not form axles in respect of rotation of the wheels 4, but instead each wheel 4 has its own individual axle as discussed in more detail below in relation to FIG. 3. The robot 1 includes a cleaning mechanism 6, which takes the form of a rotary cylindrical brush, and this is also fixed to the chassis 2. It will be seen that the four wheels are spaced as far apart from each other as the overall dimensions of the robot allows.

Figure 2:
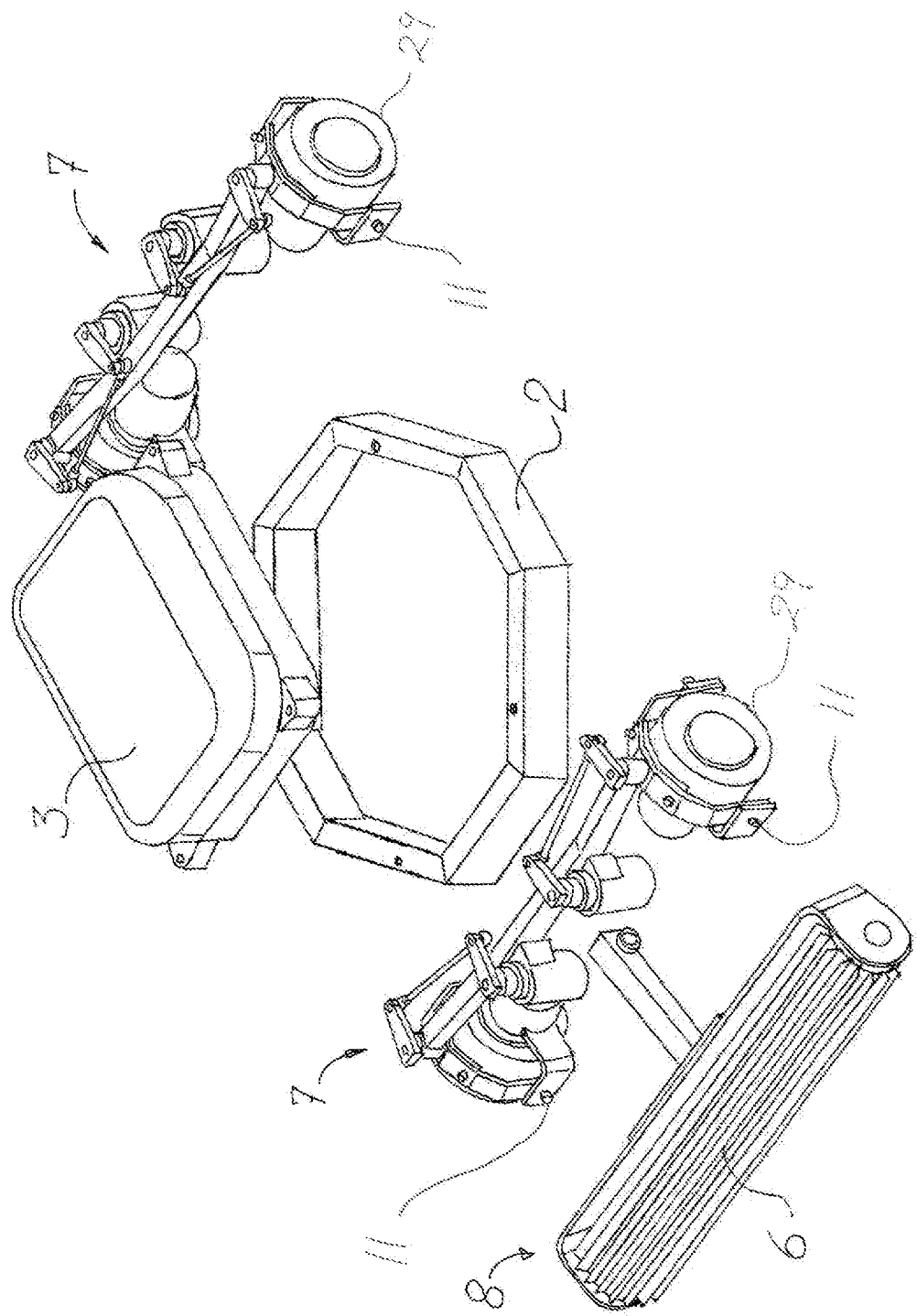
FIG. 2 shows the robot of FIG. 1 in exploded view illustrating the modular nature of the suspension arrangement.

FIG. 2 is an exploded view of the robot 1, showing the modular nature of the robot's construction. The beam "axle" assemblies 7 form removable "modules" containing the wheels 4 together with their drive, suspension, and steering means. The container 3 and the frame 2 are also in effect modules. The brush 6 on its support also forms a module as a cleaning (grooming) assembly 8. The division into modules enables a quick and efficient finish assembling operation during the build of the robot 1, and greatly facilitates repair- and maintenance when the robot 1 is deployed in field service. The beam assemblies 7 are further sub-divided into smaller modules as discussed below, such as modules for components of the wheels 4 and the associated steering and suspension parts.

Figure 4:
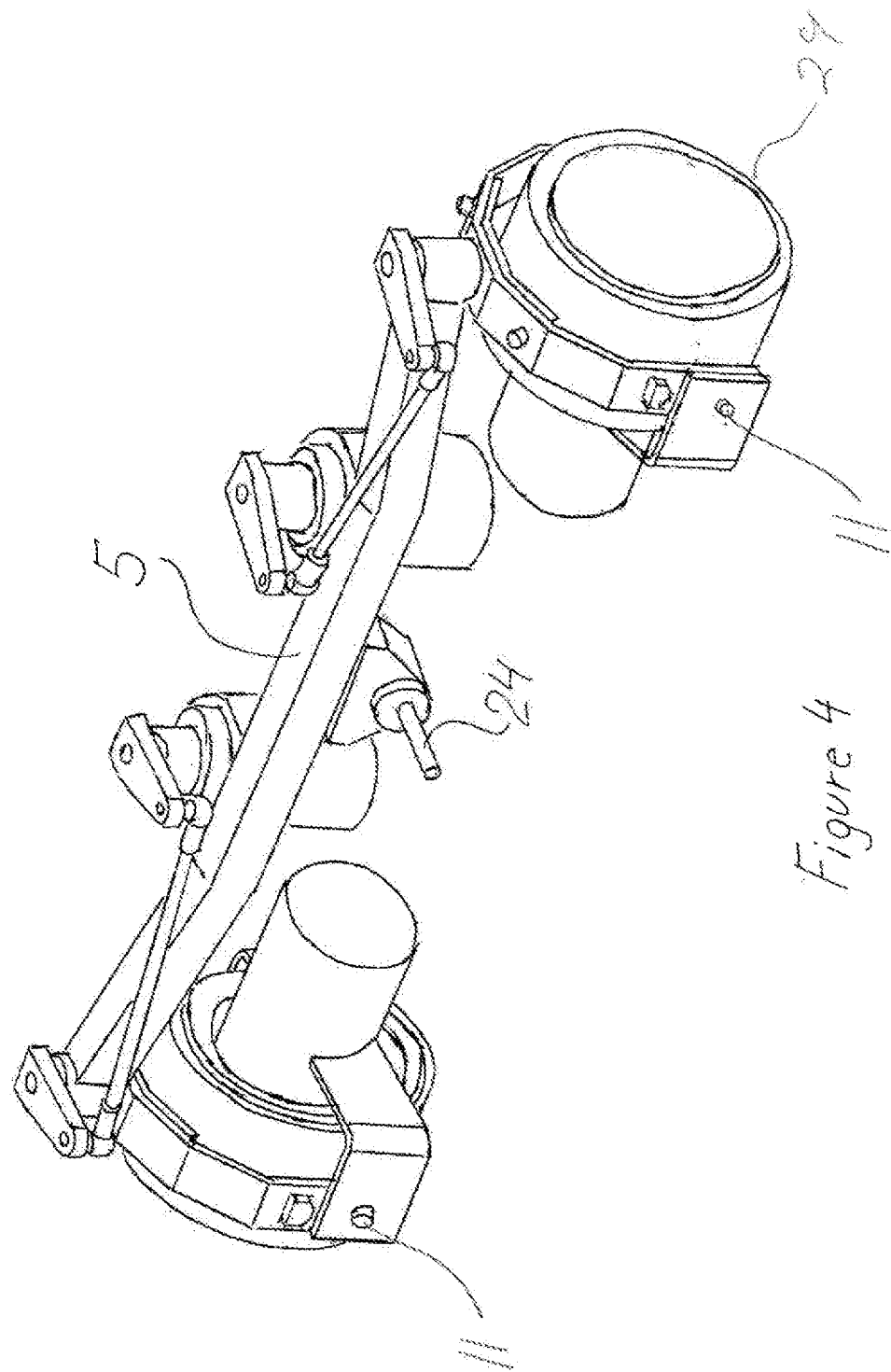
FIG. 4 is a close-up view of the suspension arrangement and steering mechanism for a pair of wheels that are pivotally fixed to the robot of FIG. 1.

The robot 1 includes a suspension arrangement of which one part is provided by the ability of the two beams 5 (and all elements of the beam assemblies 7) to pivot relative to one another. Thus, one beam 5 is rigidly fixed to the chassis 2, whereas the other is mounted pivotably to the chassis 2. In this example the forward wheels 4 are rigidly fixed to the chassis 2 via the associated beam 5. This allows them to sit closer to the brush 6 without risk of the brush 6 obstructing the action of the suspension arrangement. The rear wheels 4 are pivotally fixed to the chassis 2, with the associated beam 5 being coupled to the chassis 2 via a pivot 24 as shown in FIG. 4. The two pairs of wheels can therefore shift in position to follow curved or uneven sections of the hull surface.

Figure 3:
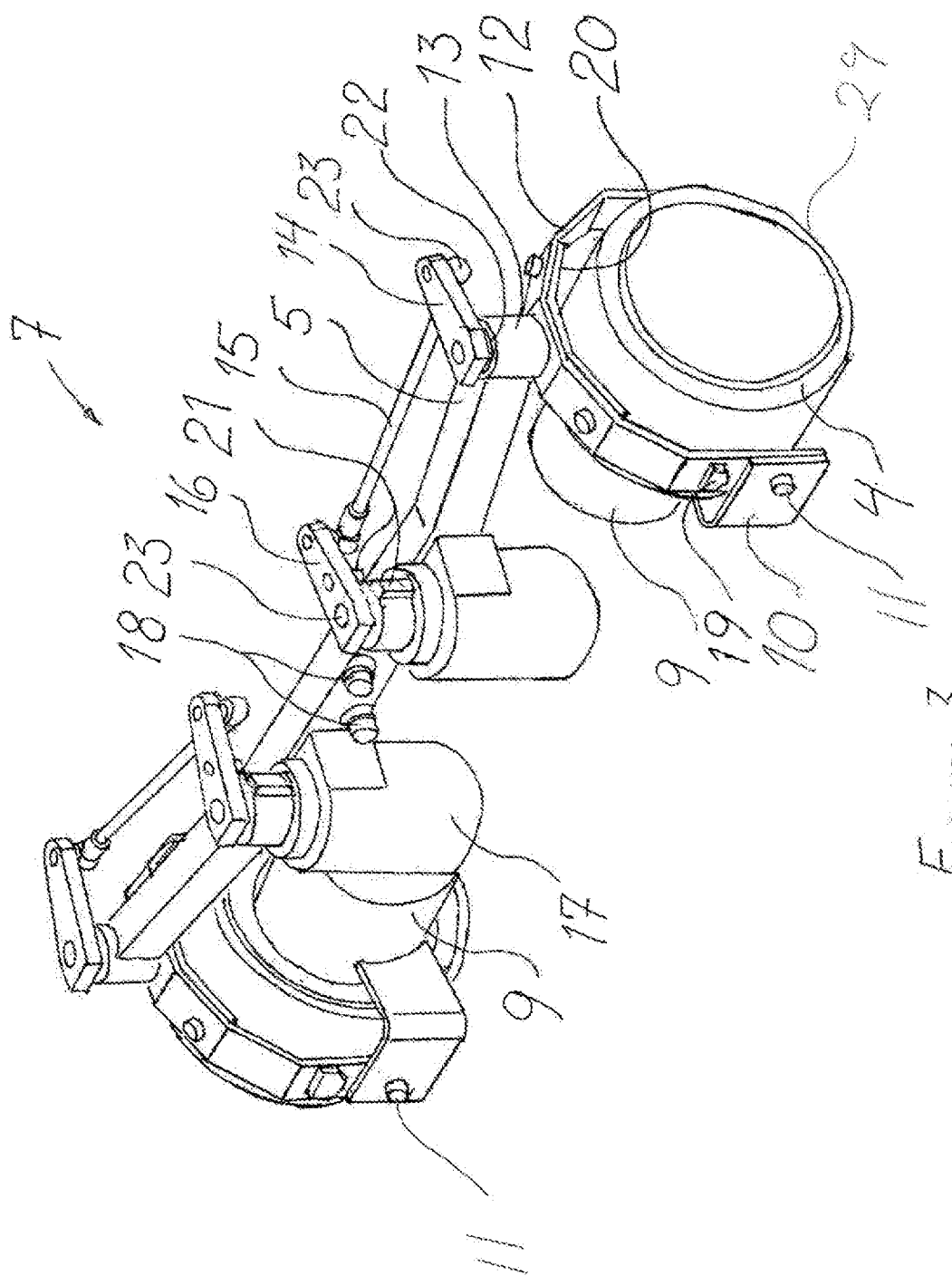
FIG. 3 is a close-up view of the suspension arrangement and steering mechanism for a pair of wheels that are rigidly fixed to the robot of FIG. 1.

FIG. 3 provides a detailed view of the forward beam assembly 7. As noted above this is rigidly fixed to the frame and this is done via by the bolts 18 (frame not shown in this drawing). The parts relating to the wheels 4, motors 9, steering mechanism and camber pivot mechanisms are similar to those for the rearward beam assembly 7, which is shown in FIG. 4. In fact there is a modular design for the wheels 4 and their associated suspension and steering parts in which diagonally opposite components are identical. Thus, the front left wheel is held with a module that is identical to the equivalent module at the rear right, with identical components of the camber pivot mechanism and the steering mechanism, and equivalently there is similarity for the front right and the rear left. The electric motor 9 is within a housing that also includes any necessary gearing, and some of these parts are held within the hub of the wheel 4. This hub motor arrangement allows for each wheel 4 to be driven independently as required, with an "axle" for each wheel 4 formed by the connection to the housing of the motor 9. The wheel 4 is hence rotatably fixed to the housing of the motor 9.

The camber pivot mechanism, which forms another part of the suspension arrangement for the robot, includes (for each wheel) a bracket 10 that is fixed to the housing of the motor 9, and a stirrup 12 (a cradle-like structure in this example) that connects to the bracket 10 through a camber pivot 11, formed by pivot bolts at the fore and aft of the wheel 4. There are no springs or other resilient biasing mechanism that affects the freedom of the wheel 4 to rotate under the action of the camber pivot 11. The stirrup 12 is joined to the beam 5 via a steering mechanism. The wheel 4 is free to swivel relative to the beam 5 within a defined angle about a camber pivot axis defined by a line through the fore and aft pivot bolts. This camber pivot axis is perpendicular to the axis of rotation of the wheel 4 and would generally extend in the horizontal relative to a vertical axis of the robot 1. It would also usually sit parallel with the surface of the hull on which the robot 1 is placed. The camber pivot mechanism enables the wheel to adapt so it is always "upright" to the hull surface that it connects to, with maximum alignment of the wheel contact surface to the hull surface, even when this surface is uneven or is at an angle to the basic orientation of the robot chassis 2. This "wheel camber compensation" angle is limited to the specified angle in either rotary directions by the movement stop means 19 on the stirrup 12.

The stirrup 12 is rotatably fixed to the beam 5 through the housing 13, which is rigidly fixed with the beam 5 and forms an element of a steering mechanism for the wheel 4. The stirrup 12 may be produced by being formed from a flat bar. It may be laminated in the sense that it may have two or more such bars 12, 20, and the bars 12, 20 may be of unequal length. This makes the cradle somewhat flexible in the fore and aft directions as well as in the vertical direction, albeit relatively stiff, and it allows for a wheel suspension which is stiffly sprung in some directions, however is sufficiently rigid about the "vertical steering axis" so that the direction of the wheel can be controlled. The resilience of this suspension may be tuned so that it has no significant negative influence on the driving, traction, adhesive and steering characteristics of the robot, and such that it does not add any bias or resilience in terms of the static forces in the suspension arrangement. However, it can be beneficial to allow for some absorption of dynamic impact loading in order to cushion the robot, particularly the electronics and electrics of the control- and power system, against blows from the wheel 4.

For each wheel a steering mechanism is provided, and as noted above this uses identical parts for diagonally opposite wheels. The steering mechanism allows for rotation of the stirrup 12 about the housing 13, and hence for rotation of the wheel about a generally vertical direction with reference to orientation of the robot 1 (more correctly with reference to orientation of the beam 5. A steering arm 14 at the top of the housing 13 is coupled to a shaft passing through the housing 13 and fixed to the top of the stirrup 12. This runs in bearings 22 in the housing 13. The steering arm 14 is connected to a steering input arm 16 through a drag link 15, such as via pivots or ball joints 23. This arrangement may be set up geometrically as a "parallelogram mechanism", or the arms 14 and 16 may be set up "non-parallel" to create the so called "Ackermann" effect between a pair of steered wheels 4 on the same axis, as seen in a top view of the mechanism. The Ackermann effect, which among other things is about ensuring that the centres of the arc of movement of either wheel 4 intercept each other at the centre of the radius of the curve which is steered, may alternatively be created through the control system for the steering actuators 17. The purpose of this effect is to minimise sliding contact of the wheels 4 with the hull during steering movements. The steering actuators 17 are fixed to the beam 5, in other words they may be mounted to supports that form an integral part of the beam assembly 7 and they move along with the beam 5. In an alternative design a single steering actuator may connect to both wheels 4 of the beam assembly 17. The steering actuator 17 typically has an electric motor that drives the output steering arm 16 through a reduction gear. Further the actuator 17 may have integral end stops 21 that limit the steering angle of the arm 16, in both directions.

As noted above, FIG. 4 shows the rear beam assembly 7 and this is broadly similar to the forward beam assembly 7 (and includes identical parts for diagonally opposite wheels 4). It differs in that the beam 5 is rotatably attached to the chassis 2 of the robot in order to allow for movement of the wheels within. This is achieved by the means of a suspension pivot 24, which is fixed to the axle 5 of the module. The freedom of the pivoting beam 5 to swivel about the axis of the suspension pivot 24 is limited to a defined angle in either direction by movement end stops (not shown). It is understood that the end stops for the largest allowed steering angle may alternatively be placed closer to the wheel, such as at the stirrup. There are no springs or similar resilient mechanisms that affect movement of the pivoting beam 5 around the suspension pivot 24.

It should be noted that the components used for the wheels 4, motors 9, camber pivot mechanisms 10, 11, 12 and the steering mechanisms including the steering arm 14, bearings 22, housing 13, steering rod (drag link) 15 are formed into a module that can be detached from the beam 5. These modules are identical for diagonally opposite wheel modules to allow for interchangeability of components during manufacture and maintenance of the robot. The steering actuator 17 and actuator steering arm 16 may also be identical for diagonally opposite wheel modules, and could be similar for all four wheels in some cases. For directly opposite wheels (and hence also wheels on the same side of the robot) there may be a mirror symmetry for some parts, such as for the camber pivot mechanisms.

Figure 5:
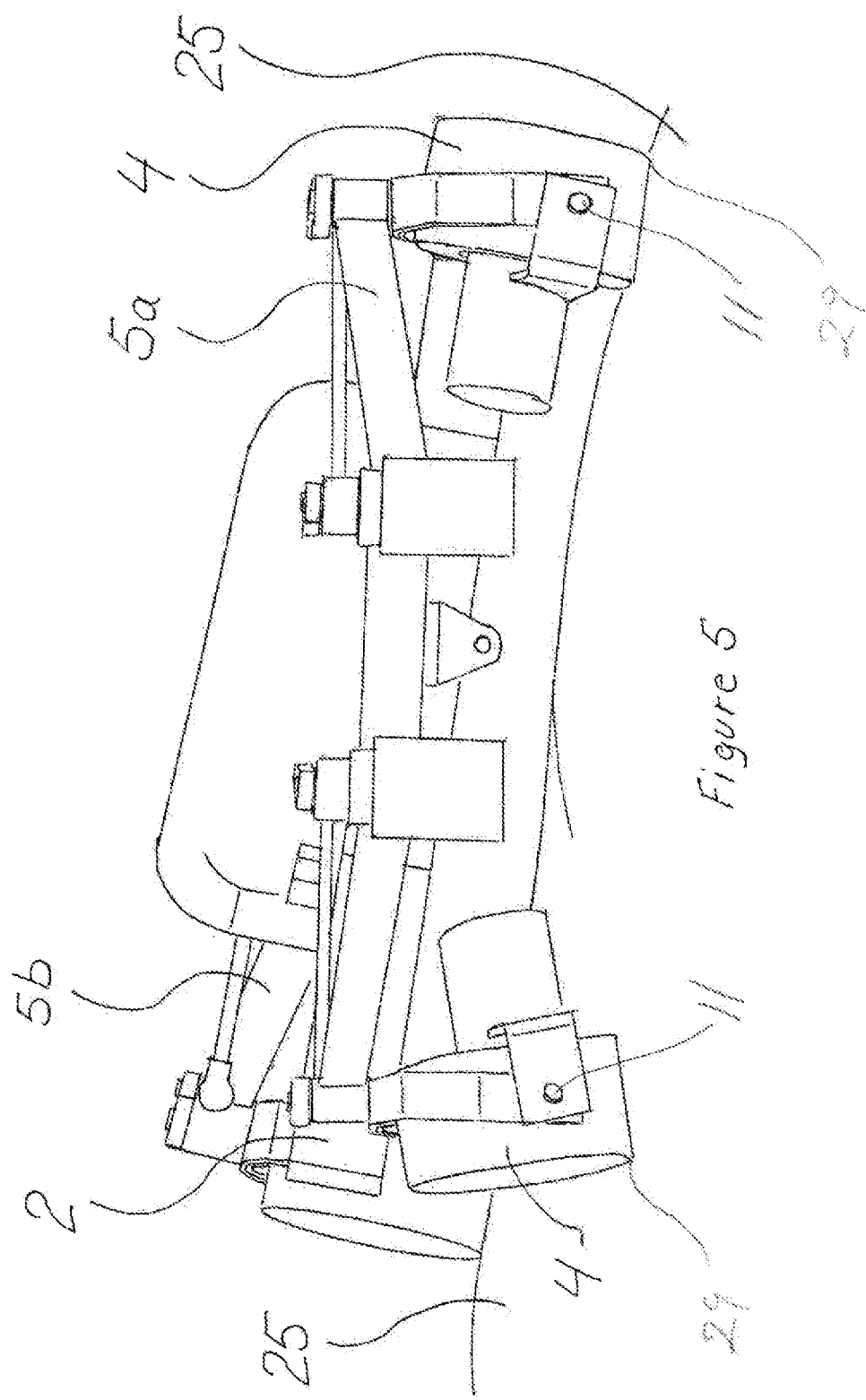
FIG. 5 illustrates the action of the suspension pivot mechanism.

FIG. 5 illustrates the action of the pivoting beam 5 and shows the robot traversing—at an angle—an uneven bulge on a hull surface 25 between a side and a bottom of a hull. The forward beam 5b is fixed to the chassis 2 of the robot and hence aligns with the chassis 2. The rearward beam 5a is attached to the chassis 2 with the pivot 24 and hence can swing relative to the chassis 2 and the forward beam 5b. FIG. 5 shows how beam 5b is pivoting in order that its wheels follow the hull surface 25. The Figure also shows how the wheels 4 swivels about the camber pivots 11 to align to the surface of the hull 25, so that the wheels are "upright" to the surface locally. It is understood that the forces that ensures these angular alignments are the magnetic adhesive forces of the wheels 4 since there are no springs or other biasing on the suspension pivot 24 or the camber pivots 11.

This comes into effect independently of the position of the robot 1 on the hull surface 25, be it that the robot is "inverted" under the bottom of the hull, is at the side of the hull, or at the bilge portion between these areas. It is further understood that the magnetic adhesive force of each wheel is dimensioned to, in all positions, to negotiate the gravity force on the robot, as well as the forces from the seawater, such as waves, stream, or as induced by the "fluid dynamical" resistance when the robot is moving through the water. In addition the adhesion is dimensioned to cope with any reaction forces that stem from tools that the robot may be operating.

FIGS. 6a and 6b shows the robot positioned on the side of the hull, in which case the robot may be prone to "tipping over" in two different ways. In FIG. 6a, if the top wheel in the Figure lost contact with the hull surface then the robot may flip about a contact point 28 between the bottom wheels and the hull surface. In FIG. 6b, the same may apply around the pivot 11 of the wheels at the bottom side of the robot 1. A further failure mode would be that each of the magnetic wheels would tip around their edges 29 in parallel. It can be shown that by having sufficiently width "b" of the wheels, in combination with a sufficiently strong magnetic adhesive force 26, together with a "low" centre of gravity 27 and a "low" pivot height "c" relative to the height "a" of the centre of gravity 27, the robot will not tip (flip) over in either orientation. Thus, as can be seen in the Figures the pivot height "c", i.e. the height of the camber pivot axis, is closer to the surface of the hull than the axis of rotation of the wheel. In this discussion "low" is in relation to the extent of the robot away from the hull, i.e. in the sense of the vertical axis of the robot. In this way the use of a robot with four (or more) wheels has advantages compared to a three wheel robot, since the potential tipping point is spaced further apart from the centre of gravity.

As noted above it is possible to add further wheels. FIG. 7 shows a robot with three beams 5 and six wheels in three pairs. This robot is capable of maintaining a contact to a curved hull in a similar manner as the version with four wheels since the added beam 5d is coupled to other pivoting beam 5c via an additional pivot 31, which allows for movement of the two beams relative to each other as well as relative to the chassis 2 and the fixed beam 5 of the remaining set of wheels. An outrigger 30 is fixed to the chassis 2 and the pivot 31, with an axis in the lateral (transverse) direction of the robot, connects a longitudinal member 32 to the outrigger 31. The axles 5c and 5d connect to the member 32 by suspension pivots 24, which act in a similar way to the suspension pivot 24 for the four wheeled robot. This mechanism ensures that all six wheels 4 contact the uneven or curved surface of a hull equally, in the sense that the magnetic wheels 4 are not restricted by forces that otherwise occur in a wheel suspension to compensate for the geometry of such a hull. Each wheel has a camber pivot mechanism, which may have a similar construction to the camber pivot mechanism discussed above. All six wheels may be steered, or alternatively it can be possible to allow for steering by fewer than all six wheels. Further axles with further wheels could be added in a similar manner, using pivots at different levels in the suspension.

FIG. 8 shows the cross section of a magnetic wheel 4 that can be used with the robot discussed above. This includes the parts of the motor 9 that are within the wheel 4. In this Figure a motor housing 37 contains both the motor (not shown in this Figure) and the reduction gear in-between the motor 9 and the wheel 4. A output shaft 36 from the motor is connected to the hub of the wheel. This shaft 36 and its flange are supported on bearings (not shown). The wheel rim 35 is fixed to the output shaft 36 via the wheel hub, and this holds a pack of ring magnet cores 34. It is understood that a number of these cores 34 may be held together and fixed to the rim. Finally a resilient cover 33 is fixed to the periphery of the magnet cores 34, optionally with an intervening casing that surrounds the magnets.

The invention claimed is:

1. A robot for performing operations on a ferrous hull of a ship, the robot comprising:
   a plurality of magnetic wheels configured to enable the robot to adhere to the ferrous hull via magnetic forces; and
   a suspension arrangement configured to support the plurality of magnetic wheels on a body of the robot and configured to allow the robot to travel over uneven surfaces;
   wherein the plurality of magnetic wheels comprises a first pair of wheels and a second pair of wheels, with the first and second pairs of wheels being spaced apart from one another along a length of the robot, wherein each wheel of the first and second pairs of wheels comprises a resilient layer on the surface of the wheel having a thickness of less than 2% of the wheel diameter;
   wherein the suspension arrangement comprises a suspension pivot mechanism allowing a line extending between centers of the first pair of wheels to rotate relative to a line extending between centers of the second pair of wheels;
   wherein the suspension arrangement also comprises a camber pivot mechanism for each wheel of the plurality of magnetic wheels, with the camber pivot mechanism for each wheel allowing an axis of rotation of the wheel to rotate relative to axes of rotation of each other wheel of the plurality of magnetic wheels so that the wheel can align its axis of rotation with a surface of the ferrous hull;
   wherein the magnetic forces for adhering each wheel of the plurality of magnetised wheels to the ferrous hull act to rotate the suspension pivot mechanism and the camber pivot mechanism for each wheel; and
   wherein the first pair of wheels and the second pair of wheels are magnetised wheels enabling the robot to adhere to ferrous hulls such that the magnetic forces for rotating the suspension pivot mechanism and camber pivot mechanisms are magnetic forces applied via the magnetic wheels, with the magnetic attraction of the magnetic wheels alone being sufficient to adhere the robot to the hull.

2. A robot as claimed in claim 1, wherein the camber pivot mechanism for each wheel of the plurality of magnetised wheels lacks any bias in a pivot thereof.

3. A robot as claimed in claim 1, wherein for each wheel of the plurality of magnetic wheels, the camber pivot mechanism forms a part of a wheel module that joins the wheel to the robot, wherein the wheel module comprises an axle for the wheel, with each wheel having an individual axle that is able to rotate via the camber pivot mechanism in order to change an orientation of the individual axle relative to the individual axles of the other wheels.

4. A robot as claimed in claim 1, wherein for each wheel of the plurality of magnetic wheels, the camber pivot mechanism comprises a bracket and a stirrup member that supports the bracket, wherein a camber pivot joins the bracket to the stirrup member.

5. A robot as claimed in claim 1, wherein for each wheel of the plurality of magnetic wheels, the suspension pivot mechanism includes a pivot provided on a pivoted beam with one of the first pair of wheels or the second pair of wheels mounted to the pivoted beam, wherein the pivoted beam can rotate relative to the other of the first pair of wheels or the second pair of wheels.

6. A robot as claimed in claim 1, wherein the suspension pivot mechanism lacks any bias in a pivot thereof.

7. A robot as claimed in claim 1, wherein the robot further comprises a steering mechanism that allows for the wheels of at least one of the first pair of wheels or the second pair of wheels to rotate about an axis extending normal to contact surfaces of the wheels.

8. A robot as claimed in claim 1, wherein the robot further comprises a steering mechanism that allows for the wheels of both the first pair of wheels and the second pair of wheels to each rotate about an axis extending normal to contact surfaces of the wheels, wherein for each wheel of the first pair of wheels and the second pair of wheel, the camber pivot mechanisms rotate mechanism rotates along with the wheel.

9. A robot as claimed in claim 7, wherein for each wheel of the plurality of magnetic wheels that is steerable, the steering mechanism includes a steering arm and a yoke for each steerable wheel, wherein the yoke is configured to permit rotation of the steerable wheels without a shift in position of the steerable wheels.

10. A robot as claimed in claim 1, comprising hub motors for driving rotation of the plurality of magnetic wheels, wherein for each wheel of the plurality of magnetic wheels having the hub motor coupled thereto, the hub motor moves with the wheel as the wheel changes camber.

11. A robot as claimed in claim 1, wherein the plurality of magnetic wheels in combination with the camber pivot mechanism are removable from the robot as one module.

12. A robot as claimed in claim 1, wherein diagonally opposite wheels of the plurality of magnetic wheels and corresponding camber pivot mechanisms include identical and interchangeable components.

13. A robot as claimed in claim 1, being devoid of any element or mechanism other than the plurality of magnetic wheels for securing the robot to the ferrous hull.

14. A robot as claimed in claim 1, wherein the robot further comprises a cleaning mechanism and the robot is configured for cleaning a surface of the ferrous hull.

15. A robot as claimed in claim 14, wherein the cleaning mechanism comprises a cylindrical brush with an axis of the cylindrical brush being generally parallel to the surface of the ferrous hull and with the cylindrical brush being arranged to rotate about the axis of the cylindrical brush to apply a cleaning action to the surface of the ferrous hull when the cylindrical brush is in contact with the surface of the ferrous hull.

16. A robot as claimed in claim 15, wherein the cylindrical brush is mounted forward of the plurality of magnetic wheels such that during forward movement of the robot, the cylindrical brush acts on a part of the ferrous hull before either of the first pair of wheels or the second pair of wheels contacts the part of the ferrous hull.

17. A robot for performing operations on a ferrous hull of a ship, the robot comprising:
- a plurality of magnetic wheels configured to enable the robot to adhere to the ferrous hull via magnetic forces; and
- a suspension arrangement configured to support the plurality of magnetic wheels on a body of the robot and configured to allow the robot to travel over uneven surfaces;
- wherein the plurality of magnetic wheels comprises a first pair of wheels and a second pair of wheels, with the first and second pairs of wheels being spaced apart from one another along a length of the robot;
- wherein the suspension arrangement comprises a suspension pivot mechanism allowing a line extending between centers of the first pair of wheels to rotate relative to a line extending between centers of the second pair of wheels;
- wherein the suspension arrangement also comprises a camber pivot mechanism for each wheel of the plurality of magnetic wheels, with the camber pivot mechanism for each wheel allowing an axis of rotation of the wheel to rotate relative to axes of rotation of each other wheel of the plurality of magnetic wheels so that the wheel can align its axis of rotation with a surface of the ferrous hull;
- wherein the magnetic forces for adhering each wheel of the plurality of magnetised wheels to the ferrous hull act to rotate the suspension pivot mechanism and the camber pivot mechanism for each wheel;
- wherein for each wheel of the plurality of magnetic wheels, the camber pivot mechanism comprises a bracket and a stirrup member that supports the bracket, wherein a camber pivot joins the bracket to the stirrup member;
- wherein for each wheel of the plurality of magnetic wheels, the camber pivot has an axis of rotation that is perpendicular to the axis of rotation of the wheel; and
- for each wheel of the plurality of magnetic wheels, the axis of rotation of the camber pivot is positioned to be closer to the surface of the ferrous hull than the axis of rotation of the wheel when the robot is in use.

18. A robot for performing operations on a ferrous hull of a ship, the robot comprising:
- a plurality of magnetic wheels configured to enable the robot to adhere to the ferrous hull via magnetic forces;
- wherein the plurality of magnetic wheels comprises a first pair of wheels and a second pair of wheels, with the first and second pairs of wheels being spaced apart from one another along a length of the robot;
- wherein each wheel of the plurality of magnetic wheels is provided within a wheel module that is removable from the robot, the wheel module comprising one or more suspension components, one or more steering components, a camber pivot mechanism, a hub motor for driving rotation of the magnetic wheel, and a bracket extending from the hub motor around the wheel and joined to the camber pivot mechanism;
- wherein diagonally opposite wheel modules of the robot are identical to one another.

19. A robot as claimed in claim 18, wherein for each wheel of the plurality of magnetic wheels, the wheel module includes a camber pivot mechanism for the wheel, and identical components in diagonally opposite wheel modules comprise at least some parts of the camber pivot mechanism.

20. A robot as claimed in claim 18, wherein the steering component is positioned in order to permit rotation of the wheel without a shift in a position of the wheel.

* * * * *